No. 891,464. PATENTED JUNE 23, 1908.
G. M. CORSEY.
FRUIT JAR HOLDER.
APPLICATION FILED JULY 5, 1907.
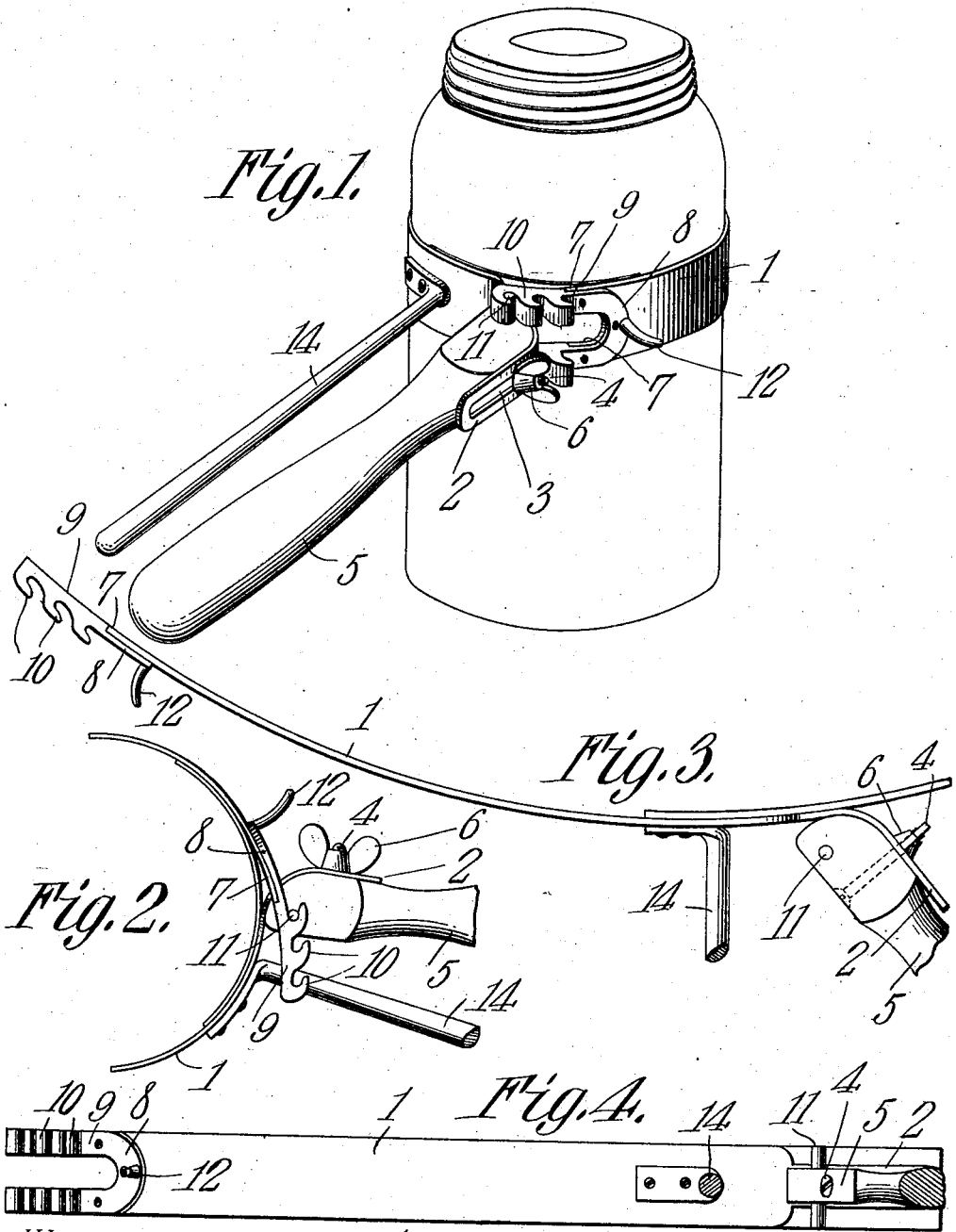
WITNESSES:
George M. Corsey, INVENTOR,
By C. A. Snow & Co.
ATTORNEYS

UNITED STATES PATENT OFFICE.

GEORGE M. CORSEY, OF WOODBURY, NEW JERSEY.

FRUIT-JAR HOLDER.

No. 891,464.　　　　Specification of Letters Patent.　　Patented June 23, 1908.

Application filed July 5, 1907. Serial No. 382,291.

*To all whom it may concern:*

Be it known that I, GEORGE M. CORSEY, a citizen of the United States, residing at Woodbury, in the county of Gloucester and State of New Jersey, have invented a new and useful Fruit - Jar Holder, of which the following is a specification.

This invention relates to an implement for grasping and holding jars and conveying them from place to place when filled with some hot substance, and has for an object to provide a device of this type which shall embody certain new features of simplicity, economy, durability and efficiency.

A further object of invention is to provide a jar holder comprising a flexible band surrounding the jar with a handle attached to one end of the band and having projecting pins to engage hooks on the opposite end of said band, and by means of this connection to tighten the holder on the jar so that it may be easily lifted and carried from place to place with perfect safety to the jar and to the hands of the person carrying them.

With these and other objects in view, the invention consists in the novel construction combination and arrangement of parts hereinafter described and definitely claimed.

In the accompanying drawings: Figure 1 is a perspective view of the jar holder applied to a glass fruit jar. Fig. 2 is a top plan view of the holder detached and bent into shape to hold a smaller jar than that shown in Fig. 1. Fig. 3 is a plan view of the holder in open position. Fig. 4 is an elevation of the jar holder open.

Similar reference numerals are used for the same parts on all the figures.

In its preferred form the jar holder comprises a band 1 of thin flexible material, sheet metal preferred, sufficiently long to surround a jar and over-lap at the ends. One end of the band is cut away at opposite edges leaving a central tongue 2 narrower than the band 1, in which a longitudinal slot 3 is made for a bolt 4 passing through the cam shaped end of a hand lever 5, and held against the lever by a thumb nut 6. By loosening the nut 6 the handle may be adjusted on the band 1 to fit larger or smaller jars. The opposite end of the band 1 is cut away at its center to form two short fingers 7 which are riveted to the bow end of a U-shaped catch block 8 the fingers 9 of which have formed on their outer faces a plurality of hooks 10 for connecting with a pin 11 extending through the inner end of the handle 5 and projecting beyond its side faces. Rising from the bow of the block 8 is a finger hook 12 by means of which the band is clamped around a jar to be lifted. Riveted to the band 1 a short distance from the tongue 2, which will place it behind the handle 5, is a rod 14 substantially as long as the handle 5 and used in coöperation with it when a jar is to be lifted.

To use this holder when it is opened out as in Fig. 3, the handle 5 is grasped with one hand and the catch block 8 with the other, then the band is folded around the jar until the fore finger of the hand clasping the handle can catch over the finger hook 12. The ends of the band are now drawn together and overlapped, the hook finger 9 passing on opposite sides of the handle 5 will engage one set of their hooks 10 with the pins 11. The finger hook 12 is now disengaged and the handle 5 and rod 14 grasped by the hand and drawn together. The handle 5 will be rocked on its cam surface and its pins 11 will draw the band 1 around the jar. If the pins 11 be engaged in the proper notch the band 1 will be drawn tight and the jar can be lifted and carried wherever desired. Should the band be too large, the pins 11 can be engaged with other hooks 10 or the thumb nut 6 may be loosened and the band shortened. The reverse action will be necessary if the band be too short.

It will thus be readily understood that a jar holder made as above described is capable of use on jars of a great variety of sizes, that it is easily applied and held fast on the jar without great expenditure of force and that it can be quickly detached when necessary.

Having thus described the invention, what is claimed is:—

1. A jar holder comprising a flexible band, a handle adjustably connected to one end thereof, pins projecting from the sides of said handle, a plurality of hooks on the opposite end of said band divided into two sets by a longitudinal slot through which said handle is adapted to pass to engage said pins with said hooks, and a second handle connected rigidly to the band near the adjustable handle.

2. A jar holder comprising a flexible band, a handle adjustably connected to one end thereof, pins projecting from the sides of said handle, a plurality of hooks on the opposite end of said band adapted to engage said pins, and a finger hook on the same end of the band as said hooks which engage said pins.

3. A jar holder comprising a flexible band having a reduced end, a handle adjustably attached to said reduced end and having a cam surface in contact therewith, pins on said handle, a plate attached to the opposite end of said band and having two sets of hooks adapted to engage the pins on said handle, a finger hook on said plate, and a rod fastened to said band near said handle.

4. A jar holder comprising a flexible band reduced in width at one end and the reduced portion slotted, and at the opposite end having a pair of parallel fingers each finger provided with a plurality of hooks, an adjustable handle attached at one end to the reduced end of said band and having a clamping means passing through the slot therein, said end of the handle having a cam surface in contact with the band, said fingers being spaced apart sufficiently to admit between them said cam end of the adjustable handle, pins for engaging said hooks projecting from opposite sides of said handle, and a rod or second handle rigidly fastened to the band and adapted to coöperate with the adjustable handle to clamp the band on the jar.

In testimony that I claim the foregoing as my own, I have hereto affixed my signature in the presence of two witnesses.

GEORGE M. CORSEY.

Witnesses:
 HERBERT CORSEY,
 FRANCIS B. DAVIS.